(12) United States Patent
Mahaffey et al.

(10) Patent No.: US 11,299,872 B2
(45) Date of Patent: Apr. 12, 2022

(54) WASHROOM MONITORING SYSTEM

(71) Applicant: Kimberly-Clark Worldwide, Inc., Neenah, WI (US)

(72) Inventors: Cleary E. Mahaffey, Canton, GA (US); Stephen Becker, Cumming, GA (US)

(73) Assignee: KIMBERLY-CLARK WORLDWIDE, INC.

( * ) Notice: Subject to any disclaimer, the term of this patent is extended or adjusted under 35 U.S.C. 154(b) by 109 days.

(21) Appl. No.: 16/958,254

(22) PCT Filed: Dec. 28, 2018

(86) PCT No.: PCT/US2018/067818
§ 371 (c)(1),
(2) Date: Jun. 26, 2020

(87) PCT Pub. No.: WO2019/133787
PCT Pub. Date: Jul. 4, 2019

(65) Prior Publication Data
US 2020/0332499 A1    Oct. 22, 2020

Related U.S. Application Data

(60) Provisional application No. 62/612,117, filed on Dec. 29, 2017.

(51) Int. Cl.
*E03B 7/00* (2006.01)
*E03B 7/07* (2006.01)
*G06Q 50/06* (2012.01)

(52) U.S. Cl.
CPC .............. *E03B 7/003* (2013.01); *E03B 7/072* (2013.01); *G06Q 50/06* (2013.01)

(58) Field of Classification Search
CPC ........... E03B 7/03; E03B 7/072; G06Q 50/06; A47K 5/06
(Continued)

(56) References Cited

U.S. PATENT DOCUMENTS

| 4,914,758 A | 4/1990 | Shaw |
| 5,217,035 A | 6/1993 | Van Marcke |

(Continued)

FOREIGN PATENT DOCUMENTS

| CN | 101080189 A | 11/2007 |
| CN | 101911108 A | 12/2010 |

(Continued)

*Primary Examiner* — Michael P Nghiem
*Assistant Examiner* — Dacthang P Ngo

(57) ABSTRACT

Methods, systems and apparatus for a monitoring system including a plurality of dispensers each configured to be located in a washroom and dispense a respective consumable hygiene product through a dispense cycle, where each of the dispensers is associated with a water source device; a water flow measurement device configured to measure water flow to the water source devices; and a data processing apparatus configured to receive indications of dispense cycles from the dispensers, to receive a water flow measurement from the water flow measurement device, determine which water source device was active by associating one of the water source devices with one of the dispensers based on a first time of the dispense cycle of the one of the dispensers and a second time of the water flow measurement and determine a water flow fault of the one of the water source devices based on the first and second times.

10 Claims, 3 Drawing Sheets

(58) Field of Classification Search
USPC .......................................................... 703/51
See application file for complete search history.

(56) References Cited

U.S. PATENT DOCUMENTS

| | | | |
|---|---|---|---|
| 6,369,714 | B2 | 4/2002 | Walter |
| 6,934,977 | B1 | 8/2005 | Quintana et al. |
| 7,360,413 | B2 | 4/2008 | Jeffries et al. |
| 2010/0268381 | A1 | 10/2010 | Goerg et al. |
| 2012/0112906 | A1* | 5/2012 | Borke .................. G08B 21/245 |
| | | | 340/539.13 |
| 2013/0133762 | A1* | 5/2013 | Snodgrass ................ G04F 3/02 |
| | | | 137/552.7 |
| 2013/0186196 | A1 | 7/2013 | Veros et al. |
| 2017/0131174 | A1 | 5/2017 | Enev et al. |
| 2017/0254060 | A1* | 9/2017 | Hall ....................... A47K 10/38 |

FOREIGN PATENT DOCUMENTS

| | | | |
|---|---|---|---|
| CN | 104731048 | A | 6/2015 |
| EP | 1708602 | B1 | 6/2012 |
| KR | 100765153 | B1 | 10/2007 |
| WO | 17188973 | A1 | 11/2017 |

* cited by examiner

WASHROOM MONITORING SYSTEM

This application claims priority from U.S. provisional Patent Application Ser. No. 62/612,117 filed on Dec. 29, 2017, the entire contents of which are incorporated herein by reference.

BACKGROUND

This disclosure relates to monitoring water flow in a washroom.

Remotely troubleshooting water flow issues, e.g., a blockage or leak, in a washroom can often be challenging as all (or multiple) water usage devices may be fed from a single water supply source. As such, it can be difficult to remotely determine which device is causing (or has) the water flow issue. For example, a water supply source can provide water to a washroom having three bathroom stalls and two sinks. If one of the sinks is over running or leaking there may be a small continuous water draw from the supply source. However, because all three stalls and both sinks are fed through the same supply, a maintenance technician would have to visit the washroom to determine which of the five water usage devices was causing the unwanted water draw.

SUMMARY

In general, the subject matter of this specification relates monitoring water usage in a washroom or other water using environments with hygienic consumable dispensers.

In general, one aspect of the subject matter described in this specification can be implemented in a monitoring system comprising a plurality of dispensers each configured to be located in a washroom and dispense a respective consumable hygiene product through a dispense cycle, wherein each of the dispensers is associated with a water source device; and a water flow measurement device configured to measure water flow to the water source devices; and a data processing apparatus configured to receive indications of dispense cycles from the dispensers, to receive a water flow measurement from the water flow measurement device, determine which water source device was active by associating one of the water source devices with one of the dispensers based on a first time of the dispense cycle of the one of the dispensers and a second time of the water flow measurement, and determine a water flow fault of the one of the water source devices based on the first and second times. Other embodiments of this aspect include corresponding methods, apparatus, and computer program products.

Yet another aspect of the subject matter described in this specification can be implemented in methods that include determining water flow to or from a plurality of water source devices; monitoring dispense cycles from a plurality of dispensers, wherein each of the plurality of dispensers is associated with one of the water source devices; in response to determining the water flow, determining which of the plurality of dispensers had a dispense cycle within a specific time range of the water flow; monitoring the water flow to determine a water flow fault of the water source device associated with the dispenser having the dispense cycle. Other embodiments of this aspect include corresponding systems, apparatus, and computer program products.

Particular embodiments of the subject matter described in this specification can be implemented so as to realize one or more of the following advantages. Given that multiple water usage devices in a washroom can be fed through the same water supply, a water fault condition, e.g., a water leak or blockage, can be located based on the actuation or use of dispensers in the washroom, which allows for possible remote troubleshooting/diagnostics and correction and/or, if an in person visit is required, reducing the time it takes a technician to isolate which device is causing the problem. For example, if a washroom includes two sinks and two hand towel dispensers, and the system detects that there is an unwanted water draw (e.g., a user left a faucet running), the system can determine which hand towel dispenser was and used and infer that the sink proximate that hand towel dispenser must have been used and left running. The system can then close a valve to the sink or alert a maintenance technician to service the sink-in-question.

Thus the system can reduce the time and cost associated with servicing a washroom as it can provide detailed fault/ service information to the technician, which avoids the technician having to check all of the water using devices for a malfunction. And the system can also reduce water waste from leaking or running water usage devices as, for those devices with remotely actuated valves, the system can turn off the valve to the malfunctioning device to reduce or eliminate water waste until the malfunction can be corrected.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
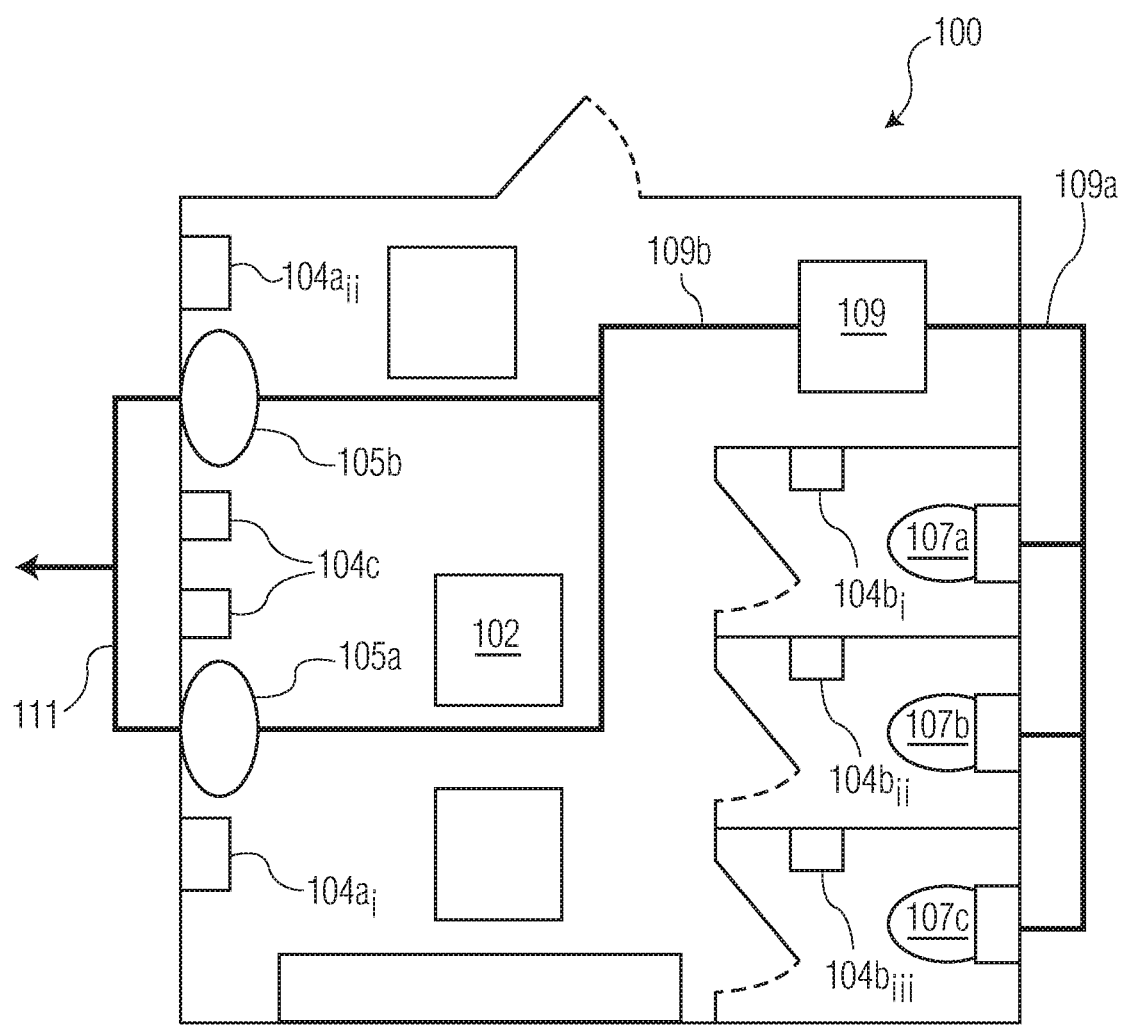
FIG. 1 is a block diagram of an example environment in which a monitoring system can be implemented.

The present disclosure generally relates to monitoring an environment having both water usage devices (e.g., sinks and toilets) and dispensers (e.g., hygienic dispensers such as hand towel or bath tissue dispensers) for water flow issues (e.g., water leaks and water blockages). In many installations, water usage (or water source) devices in a washroom or similar environment are fed by a common water supply or a few common water supplies. Thus not every water usage device has its own dedicated water supply. As such, it is difficult to determine which water usage device is being used as multiple such devices are fed from the same water supply. For example, if there are two sinks in a washroom connected to the same water supply it would be difficult to determine which of the two sinks is being used. Thus if one sink is inadvertently left running or is leaking, there would be a draw from the water supply (e.g., as determined from water flow through a valve in the water supply channel) but it would be difficult to determine which of the two sinks was causing the draw as both are supplied through the same supply/valve.

Generally, a water source device is used in conjunction with the dispenser, and thus associated with the dispenser. For example in a bathroom or washroom stall a bath tissue dispenser is provided next to (proximate) the toilet. Or a hand towel dispenser is provided next to a sink for drying after washing hands or a soap dispenser is provided next to a sink to provide soap for washing hands. Thus a soap or hand towel dispenser is generally used in conjunction with a sink for a hand washing event and a bath tissue dispenser is generally used in conjunction with a toilet for a bathroom event.

Given these relationships, the system described herein can use dispenser actuations/use to help determine which water usage device was used and, hence, may be causing the unwanted water draw or blockage. For example, consider a washroom with a sink, a hand towel dispenser for the sink, a toilet and a bath tissue dispenser for the toilet, and the sink and toilet are fed by the same water supply. If the sink is used and the faucet is not fully turned off there will be a slight water draw. The system can determine, from the valve or other water flow monitoring device in the water supply, that there is a prolonged water draw. The system can analyze dispenser use in the washroom and determine that the hand towel dispenser was most recently used, indicating that the sink was recently used. Based on this correlation, the system can determine, e.g., through inference, that the sink is the source of the unwanted draw as it was likely most recently used. The system can then alert an attendant to check the sink or, for those installations with remotely controlled valves, the system could temporarily turn off the water supply valve until the sink can be serviced or checked. The operation of such a monitoring system is described in more detail below with reference to FIG. 1.

FIG. 1 is a block diagram of an example environment in which a hygiene water flow monitoring system 100, e.g., a washroom water flow monitoring system, can be implemented. In some implementations, the system 100 includes one or more dispensers 104, water source devices 105 and 107, a water flow measurement device 109 and a data processing apparatus 102. The environment can include, for example, a semi-private or public washroom or break room or another space in which dispensers 104 and water source devices 105 and 107 are located.

The dispensers 104 can include, for example, hand towel dispensers 104a, bath tissue dispensers 104b, hand soap (or other cleansing) dispensers 104c, and/or the like. These types of dispensers 104 generally dispense consumable hygiene products, which are products intended to promote good hygiene or sanitation such as by cleaning or sanitizing a user and/or a surface. A dispenser 104, more generally, is a device that holds consumable product and dispenses the consumable product in response to a stimulus, e.g., an environmental stimulus (e.g., light/darkness), at pre-determined (e.g., programmatically set) intervals or by manual user actuation such as pulling an exposed portion of the consumable product or via a pumping-type process (e.g., for some manual soap dispensers).

Dispensers 104 dispense through a dispense cycle which is an actuation of the dispenser to cause product to be dispensed. Each dispenser 104 is associated with a water source device 105/107. Such an association is an indication that a certain dispenser 104 will be used in conjunction with a certain water source device 105/107. For example, a bath tissue dispenser 104 located in a stall with a toilet 107 is associated with that toilet 107. Such associations can be based on proximity and/or set by an administrator. The data processing apparatus 102 can store and retrieve these associations. A dispenser 104 can be associated with multiple water source devices 105/107 or a single water source device 105/107. Table 1 shows example associations.

TABLE 1

| Association Number | Water Source Device | Dispenser |
| --- | --- | --- |
| 1 | 105a | 104ai |
| 2 | 105b | 104aii |
| 3 | 107a | 104bi |
| 4 | 107b | 104bii |
| 5 | 107c | 104biii |

Water source devices 105 and 107 include, for example, sinks 105 and toilets 107. More generally water source devices 105 and 107 are fixtures that provide water for a hygienic or sanitary purpose and/or remove waste water.

A water flow measurement device 109 is a device that measures or determines the flow of water (e.g., volumetric or mass) through a pipe or other conduit (e.g., 109a and 109b) feeding the water source devices 105 and 107. For example, the water flow measurement device 109 can measure the rate of flow of water or whether there is flow or not. In some implementations, the water flow measurement device 109 is part of a valve in the building water supply system (e.g., controlling the flow of water). In other implementations, the water flow measurement device 109 is separate from the valve. For example, the water flow measurement device 109 can be a differential pressure flow meter, a positive displacement flow meter, a velocity flow meter or a mass flow meter.

As described above, the monitoring system 100 includes a data processing apparatus 102. The data processing apparatus 102 can communicate with the dispensers 104, and in some implementations the water flow measurement device 109, across wireless or wired channels, or some combination thereof. For example, in some implementations, the data processing apparatus 102 includes a transceiver and microprocessor to facilitate such communications. The data processing apparatus 102 is described in more detail below in reference to FIG. 2. In some implementations, as described above, the data processing apparatus 102 communicates with the other devices through one or more wireless communication channels such as, for example, the BLUETOOTH protocol, mesh-based (e.g., ZIGBEE) protocols, a building management systems, and/or through a WAN or LAN.

In some implementations, the data processing apparatus 102 receives (or requests) from the dispensers 104 product usage information (e.g., the number of dispenses since the last refill or report from the dispenser 104), state/status information (e.g., fault conditions such as jams or low battery alerts) and/or dispense cycle occurrence data (e.g., indications of dispense cycles). The data processing apparatus 102 can store this data for later access and use ("Dispenser Condition Information"). The dispensers 104 can send such reports/information, for example, periodically (e.g., hourly or daily or after certain dispenser events such as after each dispense, a set number of dispenses or a fault condition like a jam), upon request of the apparatus 102 and/or in response to the occurrence of an event (e.g., a dispense cycle). The reports can include time stamps indicating the date and time of each dispense and the identity of the dispenser 104 (e.g., a unique identifier of the dispenser 104).

The data processing apparatus 102 can also receive a water flow measurement from the water flow measurement device 109 (e.g., through wireless or wired communication channels). For example, the water flow measurement device 109 can send flow information, e.g., the amount/level of flow and/or the existence of flow above a predefined threshold, to the data processing apparatus 102. Thus the flow data can be sent as a continuous stream of real-time or near real-time flow information and/or the flow data can be sent upon certain conditions, e.g., when the flow exceeds or falls below a threshold, or when the flow is within a certain range or falls from that range. This data can include the time of each water flow measurement.

Figure 2:
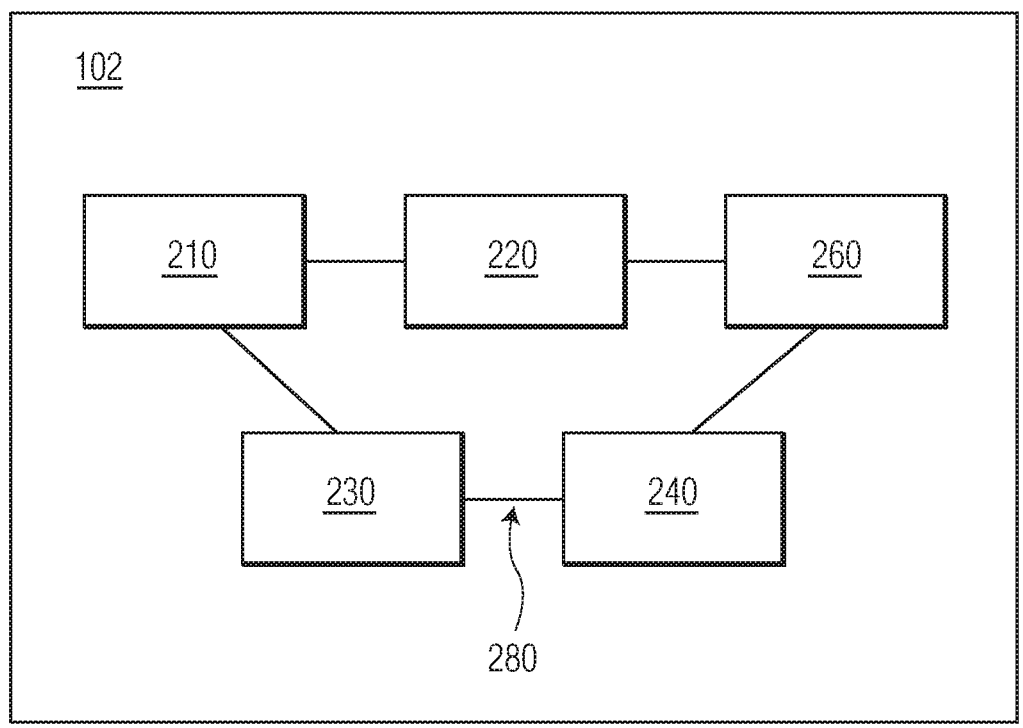
FIG. 2 is a block diagram of an example data processing apparatus.

FIG. 2 is block diagram of an example data processing apparatus 102. The data processing apparatus 102 can include a processor 210, a memory 220, a storage device 230, and an input/output device 240. Each of the components 210, 220, 230, and 240 can, for example, be interconnected using a system bus 280. The processor 210 is capable of processing instructions for execution within the data processing apparatus 102. In one implementation, the processor 210 is a single-threaded processor. In another implementation, the processor 210 is a multi-threaded processor. The processor 210 is capable of processing instructions stored in the memory 220 or on the storage device 230.

The memory 220 stores information within the data processing apparatus 102. In one implementation, the memory 220 is a computer-readable medium. In one implementation, the memory 220 is a volatile memory unit. In another implementation, the memory 220 is a non-volatile memory unit or a combination of volatile and non-volatile memory.

The storage device 230 is capable of providing mass storage for the data processing apparatus 102. In one implementation, the storage device 230 is a computer-readable medium.

The input/output device 240 provides input/output operations for the data processing apparatus 102. In one implementation, the input/output device 240 can include one or more of a network interface device(s), e.g., an Ethernet card, a serial communication device, e.g., and RS-232 port, a wireless interface device or a transceiver, e.g., an 802.11 card, BLUETOOTH interface, ZIGBEE interface.

The data processing apparatus 102 can also include a communication device)s) 260, e.g., display device, lights, microphone, speakers, to receive input data or information and/or send or communicate output data or information or indications to other input/output devices or users, e.g., service attendants.

In some implementations, the data processing apparatus 102 determines which water source device 105/107 was active (e.g., used or in use) by associating the water source device 105/107 with a dispenser 104 based on a first time of the dispense cycle of the dispenser 104 and a second time of the water flow measurement. In this way the data processing apparatus 102 determines which dispenser 104 was used in time proximity to the time of the water flow measurement, e.g., which indicates a water source device 105/107 has been used. Based on the predetermined dispenser/water source device associations stored by the data processing apparatus 102 (e.g., from Table 1), the data processing apparatus 102 identifies the water source device 105/107 associated with that dispenser 104. For example, assume toilet 107a was used, which results in a water draw detected by the water flow measurement device 109. As discussed above, because all of the water source devices 105/107 are fed through the same supply (and thus the water flow measurement device 109), the detection of water flow alone cannot pinpoint which water source device 105/107 caused the water flow/draw.

The data processing apparatus 102 receives data indicating the water flow measurement device 109 detected water flow. This data may include the time of the measurement or, if sent in real-time or near-real time, the data processing apparatus 102 records the time it received the data and time stamps the data. The time of this measurement is referred to as the second time. It's likely that a user will use a dispenser 104 after the use of a water source device 105/107. As such, the data processing apparatus 102 monitors dispenser 104 use and when it receives a report of Dispenser Condition Information from a dispenser(s) 104, the data processing apparatus 102 records the time (referred to as the first time) of the dispense cycle and the identity of the dispenser 104.

In response to receiving the water flow measurement (or according to a predetermined schedule) and with the Dispenser Condition Information in hand, the data processing apparatus 102 compares the first and second times to determine if they are within a specified range (e.g., as set by an administrator). The specified range can be, for example, 10 seconds, 20 seconds or 30 seconds starting from the second time. In response to determining the first and second times are within the specified time range, the data processing apparatus 102 determines that the water source device 105/107 associated the dispenser 104 was activated. For example, if the specified range is 10 seconds and the data processing apparatus 102 determines that the hand towel dispenser 104ai had a dispense cycle at 1:01.30 pm and the water flow measurement occurred at 1:01.25 pm, a time difference of 5 seconds and within the specified range, the data processing apparatus 102 determines these are related events and consults, for example, Table 1, to determine which water source device 105/107 is associated with the dispenser 104ai, i.e., sink 105a. In turn, the data processing apparatus 102 records that the water source device 105/107 was activated at or around the second time.

Generally, after the second time and/or first time, there would be no immediate water flow (e.g., 2-10 seconds) to the activated water source device 105/107, as the use of that water flow device 105/107 would be complete for that user. Thus, if there is continued water flow (without a related dispense cycle to indicate multiple, close in time uses of a water source device(s) 105/107) it could be indicative of a leak or a water source device 105/107 that was left on or malfunctioning, and thus experiencing a water flow fault. For example, if the sink 105ai is left on then there will be a continuous water flow, e.g., as measured by the water flow measurement device 109, from the second time to past the first time. It would normally be expected that the sink 105a would be turned off by the time a user is drying their hands, e.g., as indicated by the dispense cycle at the first time. Thus, the data processing apparatus 102 can infer a water flow fault in this scenario and send an alert message to a service technician or, if the valve feeding water to the washroom (or part of the washroom) can be remotely controlled, the data processing apparatus 102 can turn of the valve.

In some implementations, the data processing apparatus 102 can determine how to handle the water flow fault based on the rate of flow. For example, if the flow rate for the water flow fault is above a threshold rate (indicating a significant water flow fault/leak/condition), the data processing apparatus 102 can turn off water to the washroom or send an emergency message to a service technician. If the flow rate is below the threshold (indicating a minor water flow fault/leak/condition), the data processing apparatus 102 can send a non-emergency service message to the technician.

More generally described for these post water source device 105/107 activation periods, the data processing apparatus 102 monitors the water flow for a time period after the first and second times (e.g., after a determined activation) and determines that there is a water flow fault in response to a water flow irregularity during the time period (based on water flow information from the water flow measurement device 109). In some implementations, a water flow irregularity is a water flow after the first time and within a given time period, as it would be expected that other water source devices 105/107 would be used in the washroom and such subsequent uses would not be considered potential irregularity unless occurring in the given time period.

In some implementations, the system 100 includes a secondary water measurement device to measure water flow from the water source devices 105/107, as opposed to the water flow measurement device 109 which measures water flow to the water flow devices 105/107. For example, the water drainage system 111 can include the secondary water measurement device. As with the water flow management device 109, the data processing apparatus 102 can receive flow measurements from the secondary water measurement device.

When water source devices 105/107 are used, the waste water (e.g., water flowing down a sink drain) is routed through the water drainage system 111 and through the secondary water measurement device to measure the occurrence and/or flow rate of the waste water. Thus when a water source device 105/107 activation is determined, as described above, there should also be a corresponding waste water flow. If not, then it could be an indication of a blockage. Thus if there is a no or low water flow condition (e.g., below an administrator-set threshold) in the water drainage system 111 after a device 105/107 activation, then the data processing apparatus 102 determines a secondary water flow fault, and takes similar remedial measures as described above for a water flow fault.

Figure 3:
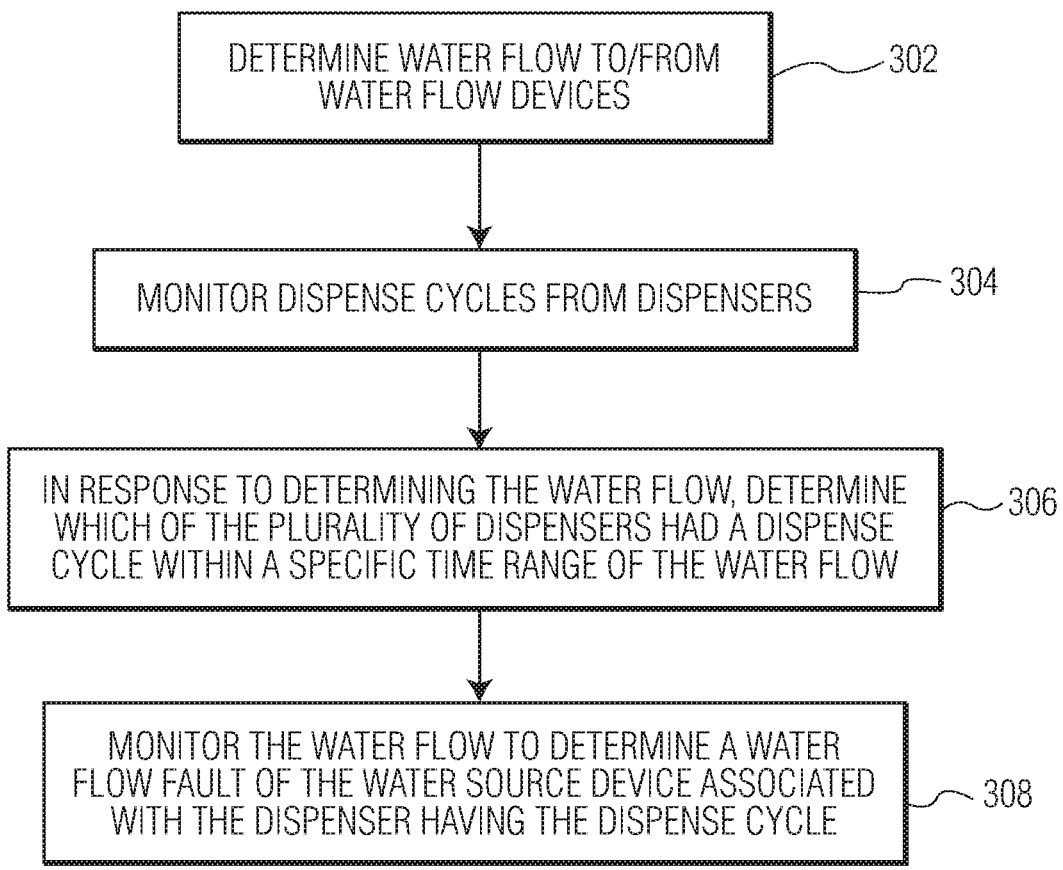
FIG. 3 is a flow chart of an example process for monitoring a washroom.

FIG. 3 is a flow chart of an example process for managing dispensers 104. The monitoring system 100 can, for example, perform the steps described with reference to FIG. 3.

Water flow to or from a plurality of water source devices is determined (302). For example, the water flow measurement device 109 determines water flow to (or, via the secondary water measurement device, waste water from) the water source devices 105/107 and communicates the measurements to the data processing apparatus 102.

Dispense cycles from a plurality of dispensers are monitored (304). For example, the data processing apparatus 102 monitors dispense cycles through Dispenser Condition Information reports received from the dispensers 104. Each dispenser 104, as described above, is associated with one of the water source devices 105/107.

In response to determining the water flow, determine which of the plurality of dispensers had a dispense cycle within a specific time range of the water flow (306). For example, the data processing apparatus 102 determines which dispenser 104 had a dispense cycle in the time range.

The water flow is monitored to determine a water flow fault of the water source device associated with the dispenser having the dispense cycle (308). For example, the data processing apparatus 102 determines a water flow fault of the water source device 105/107 based on associations between the dispensers 104 and the devices 105/107, e.g., according to Table 1.

Although the above description has focused on monitoring water flow in a washroom, the technology is applicable to other environments in which water source devices and dispensers are present.

EMBODIMENTS

Embodiment 1

A monitoring system comprising a plurality of dispensers each configured to be located in a washroom and dispense a respective consumable hygiene product through a dispense cycle, wherein each of the dispensers is associated with a water source device; a water flow measurement device configured to measure water flow to the water source devices; and a data processing apparatus configured to receive indications of dispense cycles from the dispensers, to receive a water flow measurement from the water flow measurement device and determine which water source device was active by associating one of the water source devices with one of the dispensers based on a first time of the dispense cycle of the one of the dispensers and a second time of the water flow measurement.

Embodiment 2

The monitoring system of embodiment 1, wherein the plurality of dispensers comprises at least one of a bath tissue dispenser, a paper towel dispenser, and a soap dispenser.

Embodiment 3

The monitoring system of any preceding embodiment 1, wherein the water source devices comprise a faucet, a urinal and a toilet.

Embodiment 4

The monitoring system of any preceding embodiment 1, wherein associating one of the water source devices with one of the dispensers based on a first time of the dispenser cycle of the one of the dispensers and a second time of the water flow measurement comprises comparing the first time to the second time.

Embodiment 5

The monitoring system of embodiment 4 comprising determining whether the first and second times are within a specified time range.

Embodiment 6

The monitoring system of embodiment 5 comprising in response to determining the first and second times are within the specified time range, determining that the water source device associated with the one of the dispensers was activated.

Embodiment 7

The monitoring system of embodiment 6 comprising monitoring the water flow for a time period after the first and second times and determining that there is a water flow fault in response to a water flow irregularity during the time period, wherein the water flow fault is with the activated water source device.

Embodiment 8

The monitoring system of embodiment 7, wherein the water flow fault comprise a water leak.

Embodiment 9

The monitoring system of embodiment 7 comprising a secondary water measurement device configured to measure water flow from the water source devices.

Embodiment 10

The monitoring system of embodiment 9, wherein the data processing apparatus is configured to receive a secondary water flow measurement from the secondary water flow measurement device and determine a secondary water flow fault in response to determining a low or no water flow condition from the activated water source device.

Embodiment 11

A method comprising determining water flow to or from a plurality of water source devices; monitoring dispense cycles from a plurality of dispensers, wherein each of the plurality of dispensers is associated with one of the water source devices; in response to determining the water flow, determining which of the plurality of dispensers had a dispense cycle within a specific time range of the water flow; monitoring the water flow to determine a water flow fault of the water source device associated with the dispenser having the dispense cycle.

Embodiment 12

The method of embodiment 11, wherein the water flow fault is a water leak or a water flow stoppage.

Embodiment 13

The method of any of embodiments 11-12, wherein the plurality of dispensers comprises at least one of a bath tissue dispenser, a paper towel dispenser, and a soap dispenser.

Embodiment 14

The method of any of embodiments 11-13, wherein the water source devices comprise a faucet, a urinal and a toilet.

Embodiment 15

The method of any of embodiments 11-14, wherein the specific time range is a time range from before the water flow to after the water flow.

Embodiment 16

The method of any of embodiments 11-14, wherein the specific time range is a time range before the water flow.

Embodiment 17

The method of any of embodiments 11-14, wherein the specific time range is a time range after the water flow.

Embodiment 18

A monitoring system comprising: a plurality of dispensers each configured to be located in a washroom and dispense a respective consumable hygiene product through a dispense cycle, wherein each of the dispensers is associated with a water source device; a water flow measurement device configured to measure water flow to the water source devices; and a data processing apparatus configured to receive indications of dispense cycles from the dispensers, to receive a water flow measurement from the water flow measurement device, determine which water source device was active by associating one of the water source devices with one of the dispensers based on a first time of the dispense cycle of the one of the dispensers and a second time of the water flow measurement, and determine a water flow fault of the one of the water source devices based on the first and second times.

Embodiment 19

The embodiment of 18 in combination with any of embodiments 2-10.

Implementations or aspects of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification may, in some implementations, be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The separation of various system components in the embodiments described above should not be understood as requiring such separation in all embodiments, and it should be understood that the described program components and systems can generally be integrated together in a single software product or packaged into multiple software products.

What is claimed is:

1. A monitoring system comprising:
a plurality of dispensers each configured to be located in a washroom and dispense a respective consumable hygiene product through a dispense cycle, wherein each of the dispensers is associated with a water source device;
a water flow measurement device configured to measure water flow to the water source devices; and
a data processing apparatus configured to receive indications of dispense cycles from the dispensers, to receive a water flow measurement from the water flow measurement device, determine which water source device was active by associating one of the water source devices with one of the dispensers based on a first time of the dispense cycle of the one of the dispensers and a second time of the water flow measurement, and determine a water flow fault of the one of the water source devices based on a comparison of the first time and the second time.

2. A monitoring system comprising:
a plurality of dispensers each configured to be located in a washroom and dispense a respective consumable hygiene product through a dispense cycle, wherein each of the dispensers is associated with a water source device;
a water flow measurement device configured to measure water flow to the water source devices; and
a data processing apparatus configured to receive indications of dispense cycles from the dispensers, to receive a water flow measurement from the water flow measurement device and determine which water source device was active by associating one of the water source devices with one of the dispensers based on a first time of the dispense cycle of the one of the dispensers and a second time of the water flow measurement, and
wherein associating one of the water source devices with one of the dispensers based on a first time of the dispenser cycle of the one of the dispensers and a second time of the water flow measurement comprises comparing the first time to the second time.

3. The monitoring system of claim 2, wherein the plurality of dispensers comprises at least one of a bath tissue dispenser, a paper towel dispenser, and a soap dispenser.

4. The monitoring system of claim 2, wherein the water source devices comprise a faucet, a urinal and a toilet.

5. The monitoring system of claim 2 comprising determining whether the first and second times are within a specified time range.

6. The monitoring system of claim 5 comprising in response to determining the first and second times are within the specified time range, determining that the water source device associated with the one of the dispensers was activated.

7. The monitoring system of claim 6 comprising monitoring the water flow for a time period after the first and second times and determining that there is a water flow fault in response to a water flow irregularity during the time period, wherein the water flow fault is with the activated water source device.

8. The monitoring system of claim 7, wherein the water flow fault comprise a water leak.

9. The monitoring system of claim 7 comprising a secondary water measurement device configured to measure water flow from the water source devices.

10. The monitoring system of claim 9, wherein the data processing apparatus is configured to receive a secondary water flow measurement from the secondary water flow measurement device and determine a secondary water flow fault in response to determining a low or no water flow condition from the activated water source device.

* * * * *